F. Hovey,
Cider Press.
No. 102,402. Patented Apr. 26, 1870.
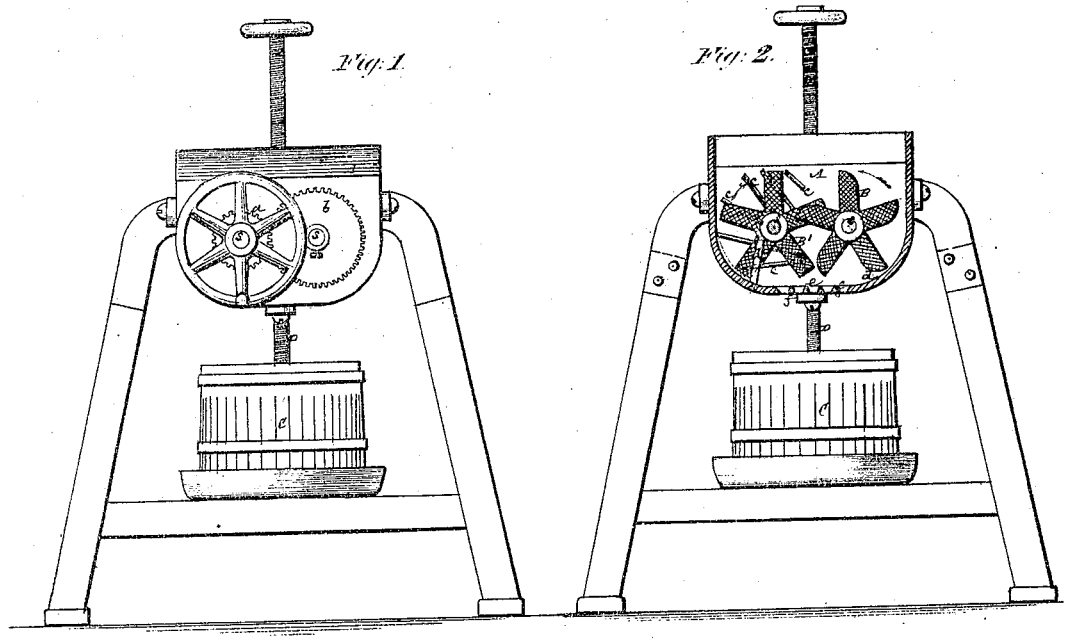
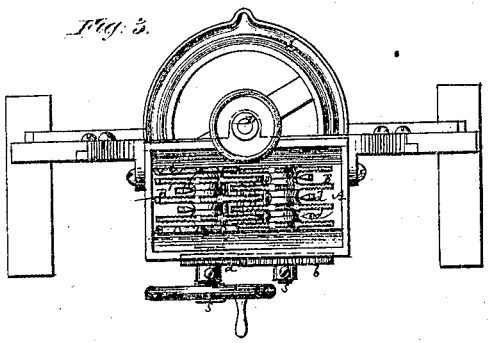
Witnesses:
Fred. Haynes
R. F. Rabeau
Francis Hovey

United States Patent Office.

FRANCIS HOVEY, OF NEW YORK, N. Y.

Letters Patent No. 102,402, dated April 26, 1870

IMPROVEMENT IN CIDER-PRESSES.

The Schedule referred to in these Letters Patent and making part of the same.

*To all whom it may concern:*

Be it known that I, FRANCIS HOVEY, of the city, county, and State of New York, have invented a new and useful Improvements in Cider-Presses, of which the following is a full, clear, and exact description, reference being had to the accompanying drawing forming part of this specification, and in which—

Figure 1 represents a side elevation;

Figure 2, a vertical section; and

Figure 3, a plan of a cider-press constructed in accordance with my improvement.

Similar letters of reference indicate corresponding parts.

My invention consists in a combination of serrated mashers of blade-form, either one revolving at a different velocity, in a reverse direction, through the other, and the one masher working in juxtaposition to obliquely-set ribs, preferably made sharp, arranged in the sides of the hopper; also, the invention includes, in combination with the elements just recited, fixed knives, arranged to extend across the discharge-aperture of the hopper, and upwardly-projecting knives from the bottom thereof.

Referring to the accompanying drawing—

A represents the hopper, into which the apples are fed, and s s', horizontal shafts arranged across and within the same, at a suitable distance apart. These shafts are speeded by gears a b, set in motion by a hand-wheel or crank, to revolve at different velocities in reverse directions.

On these shafts s s' are mashers B B', each made up of a series of radial blades that are serrated on their sides, and which are arranged in rows, with their blades of such a length that a row of blades in the one masher works between two rows of blades in the other masher.

Under such an arrangement it will be observed that, in order to fill up the hopper in a crosswise direction, the one washer B has a greater number of rows of blades than the other washer B'. This causes the outside rows of blades of the washer B' to lie so far away from the sides of the hopper that apples or portions of the fruit would fall unmashed down through between them and the sides of the hopper. To prevent this, and to assist the serrated blades of the mashers in their operation of breaking and mashing or grinding the apples, I arrange, down the insides of the hopper, opposite the ends of the masher B' containing the fewest blades, variously and obliquely-set or disposed ribs c c, of angular or knife-form in their transverse section.

I prefer, also, to arrange within the hopper, as projections from its bottom, knives d d, disposed to lie between the blades, and which may likewise be made serrated on their sides; and, furthermore, provide the discharge-aperture e of the hopper with cross-knives f f.

All these elements or devices serve to prevent any possibility of lumpy or imperfectly-mashed produce passing through the mill portion of the press to the vat C below, over the one side of which vat the aperture e is arranged, and by which arrangement room is provided for getting at the vat and for the working of the screw D of the press.

What is here claimed, and desired to be secured by Letters Patent, is—

1. The combination and arrangement of the mashers B B', made to revolve at different velocities in reverse directions, and composed of blades which are serrated on their sides, in combination with the knives or ribs c, on the sides of the hopper, in proximity to the ends of the one masher, substantially as specified.

2. The combination of the knives f f in the bottom of the hopper, with the mashers B B' made up of serrated blades, arranged and operating essentially as herein set forth.

3. The combination and arrangement of the upwardly-projecting knives d, the revolving serrated-blade mashers B B', the cross-bottom knives f f, and the ribs or knives c c, substantially as shown and described.

FRANCIS HOVEY.

Witnesses:
FRED. HAYNES,
R. E. RABEAU.